United States Patent [19]

Boschert

[11] Patent Number: 6,067,937

[45] Date of Patent: May 30, 2000

[54] MOBILE AQUARIUM

[76] Inventor: Jeffrey D. Boschert, 16310 Shannon Rd., Los Gatos, Calif. 95032

[21] Appl. No.: 08/967,460

[22] Filed: Nov. 11, 1997

[51] Int. Cl.[7] .................................................. A01K 63/00
[52] U.S. Cl. ........................................... 119/247; 119/248
[58] Field of Search .................................... 119/245, 247, 119/248, 269

[56] References Cited

U.S. PATENT DOCUMENTS

| | | | |
|---|---|---|---|
| 5,007,557 | 4/1991 | Spence | 119/245 X |
| 5,282,438 | 2/1994 | McLaughlin | 119/248 |
| 5,467,739 | 11/1995 | Boschert | 119/247 |
| 5,560,318 | 10/1996 | Yoshida et al. | 119/248 |

FOREIGN PATENT DOCUMENTS

| | | | |
|---|---|---|---|
| 2514995 | 4/1983 | France | 119/245 |

*Primary Examiner*—Robert P. Swiatek
*Attorney, Agent, or Firm*—Skjerven, Morrill, MacPherson, Franklin & Friel LLP; David T. Millers

[57] ABSTRACT

A mobile aquarium includes a display tank mounted on a wheeled cart and a system for lowering the center of gravity of the aquarium. In one embodiment, the system for lowering the center of gravity uses a storage tank that is lower than the display tank. The system transfers water from the display tank to the storage tank for moving. The lower water level in the display tank is kept high enough to provide a livable habitat for fish in the display tank. A background lighting system for the aquarium includes a light source and a semi-opaque sheet with a first image on a first side and a second image on a second side. The light source illuminates the sheet so that the second image shows through the first side of the sheet and appears behind the first image. In one embodiment, the first image has a graduate color that is lighter at one end than the other.

2 Claims, 4 Drawing Sheets

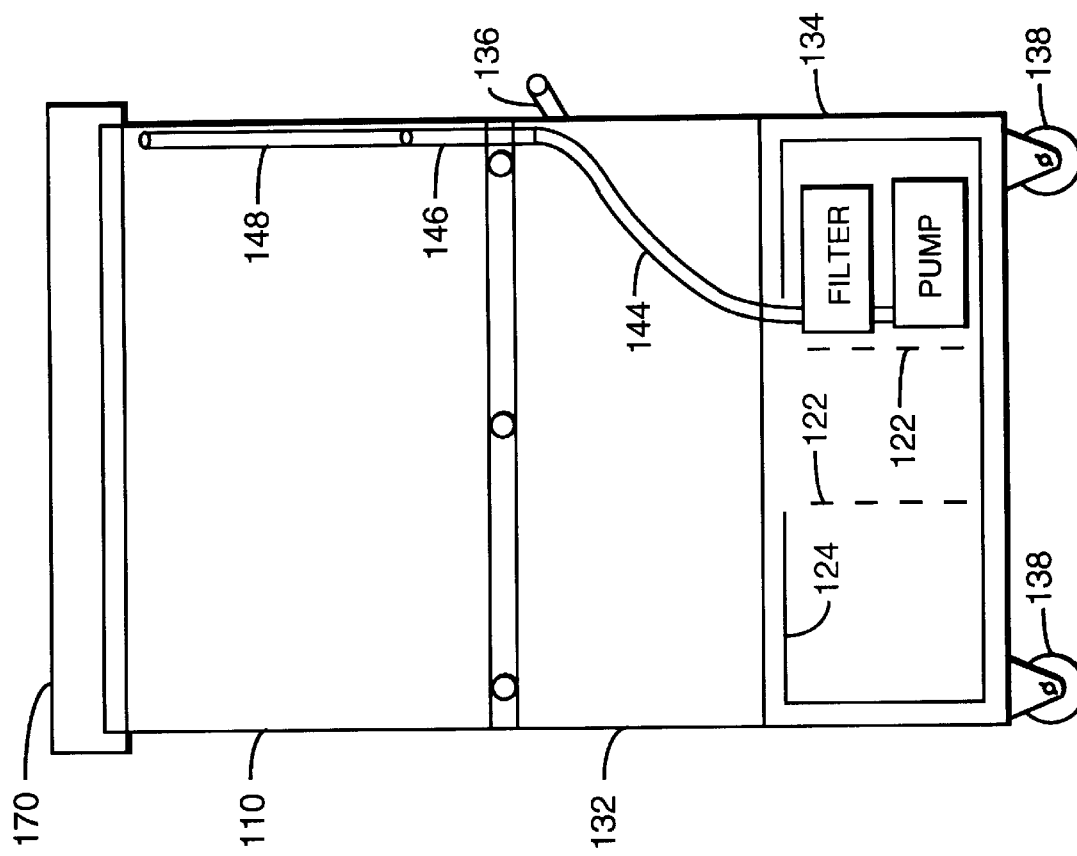
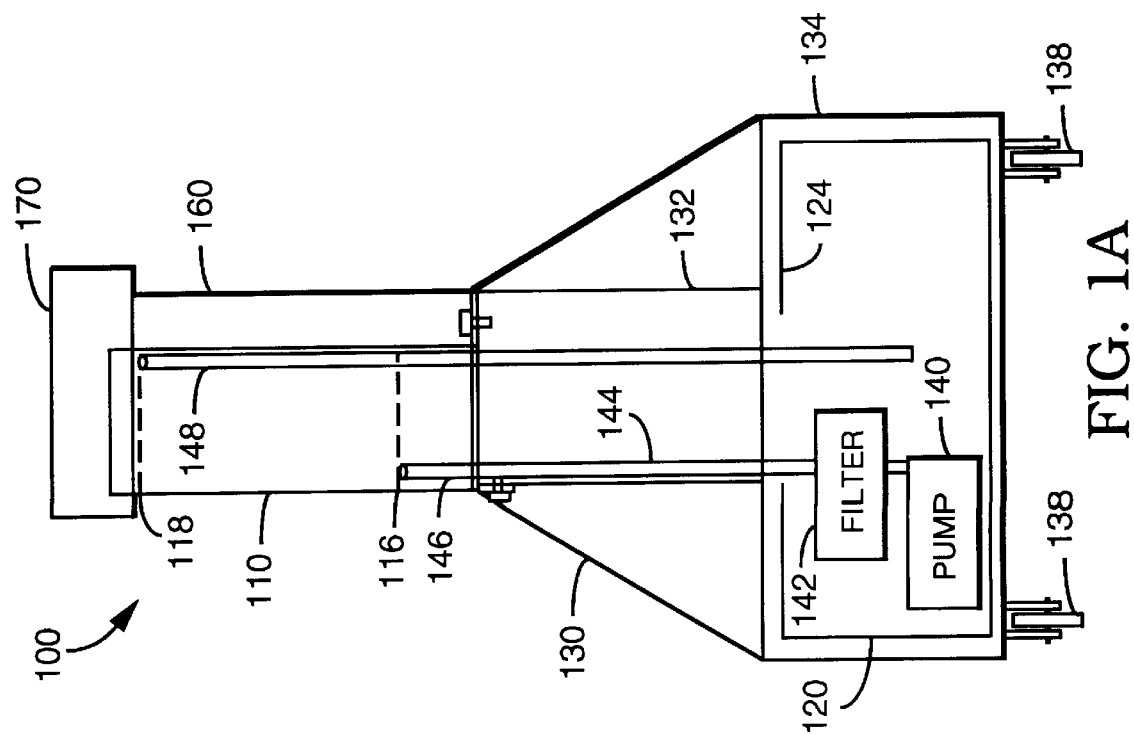

MOBILE AQUARIUM

BACKGROUND

1. Field of the Invention

This invention relates to mobile aquariums for housing and displaying fish and other creatures and to background lighting systems for aquariums.

2. Description of Related Art

Aquariums housing fish or other aquatic creatures are widely used as decorative displays in homes and businesses. Many find viewing of and interaction with living creatures such as fish in an aquarium to be soothing. Further, studies indicate that such viewing may have therapeutic effects on patients in hospitals and elderly in care homes. Accordingly, many hospitals and care homes need aquariums for their patients, particularly patients who are confined to their beds and are unable to take part in many activities. However, providing aquariums for patients presents difficulties. Often, hospital rooms have insufficient space for permanent aquariums. Even when space is available, the space may not offer ideal viewing for a person confined to a bed, or placing the aquarium for ideal viewing may create an obstacle for required treatments.

An aquarium could be moved into a room temporarily for a patient, but moving aquariums presents difficulties. In particular, water in an aquarium is relatively heavy and attachments such as pumps and filters that normally accompany an aquarium can be cumbersome. Additionally, liquids such as water are prone to spilling. When moving an aquarium, water tends to slosh and splash out of the aquarium. The spilling can be messy and can create a hazard for people who may slip on wet floors. Removing the water from an aquarium before moving the aquarium and then refilling the aquarium is possible but time consuming especially since the water takes time to properly condition for safe introduction of fish. Accordingly, a mobile aquarium and a safe method for moving a mobile aquarium are desired.

SUMMARY

In accordance with an aspect of the invention, an aquarium includes a display tank mounted on or attached to a wheeled cart that allows the aquarium to be rolled from one place to another. The aquarium may further include a system that lowers the center of gravity of the aquarium and makes the aquarium more stable (i.e., less likely to tip over) while being moved. In one embodiment, the system for lowering the center of gravity uses a storage tank mounted on the cart lower than the display tank and transfers water from the display tank to the storage tank for moving. More water in the storage tank and less in the display tank lowers the center of gravity of the aquarium. The lower water level in the display tank reduces the chances of water splashing out while the aquarium is being moved but is high enough to provide a livable habitat for fish that remain in the display tank during moving. When the aquarium is in position for viewing, a pump having an inlet in the storage tank is activated to transfer water from the storage tank back to the display tank.

In one embodiment, the display tank has an inlet/outlet connected to the pump and an overflow outlet that drains into the storage tank. When the aquarium is plugged into an outlet (presumably at rest), the pump is active, and water circulates from the storage tank, through the pump to the inlet/outlet into the display tank, and back to the storage tank through the overflow outlet. When the aquarium is unplugged for moving, water drains out through the inlet/outlet back into the storage tank. The heights of the overflow outlets and the inlet/outlet control the water levels in the storage tank for viewing and moving respectively.

In accordance with another aspect of the invention, a background lighting system for the aquarium includes a light source and a semi-opaque sheet having a first image on a first side and a second image on a second side. The light source illuminates the sheet so that the second image shows through the first side of the sheet and appears behind the first image. In one embodiment, the first image has a graduate color that is lighter at one end than the other. The background lighting creates the illusion that the second image is being view through a thick layer of water.

BRIEF DESCRIPTION OF THE DRAWINGS

FIGS. 1A and 1B respectively show side and front views of a mobile aquarium in accordance with an embodiment of the invention.

Use of the same reference symbols in different figures indicates similar or identical items.

DETAILED DESCRIPTION OF THE PREFERRED EMBODIMENTS

Figure 2:
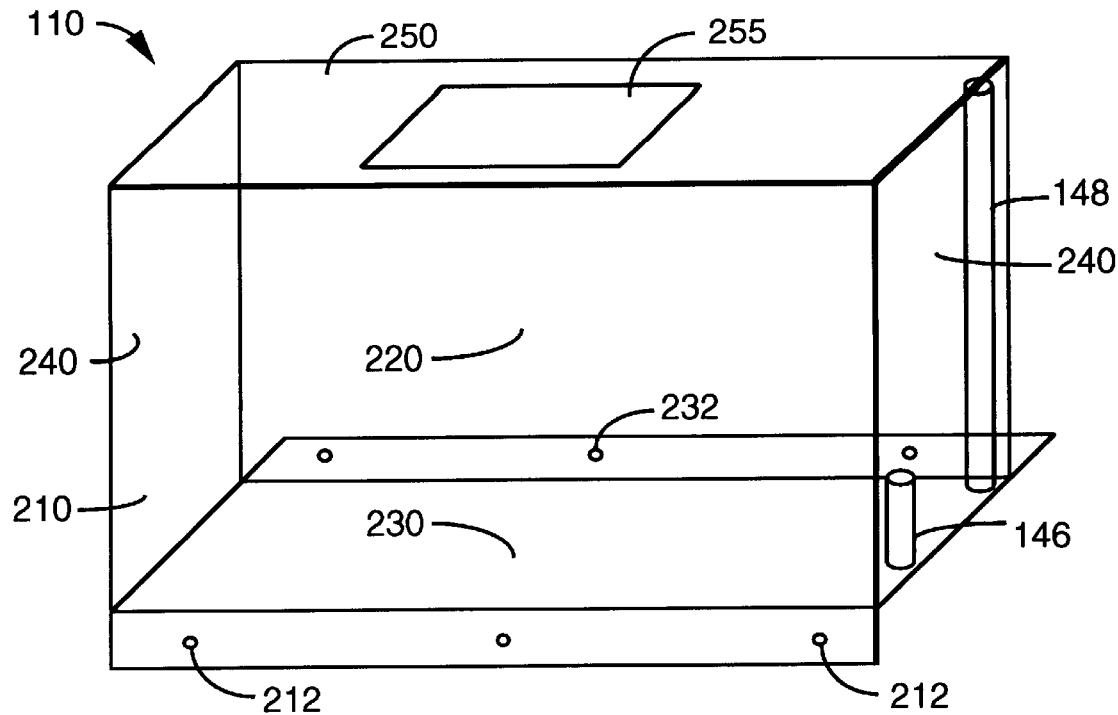
FIG. 2 shows a perspective drawing of a display tank for the mobile aquarium of FIGS. 1A and 1B.

In accordance with an aspect of the invention a mobile aquarium includes a display tank and a storage tank that are mounted on a wheeled cart and connected via plumbing system and a pump. The display tank is at a height selected for viewing, and the reserve tank is lower. When the mobile aquarium is set up for display, the pump is on and moves most of the water from the storage tank into the higher display tank. This keeps the water level in the display tank at the desired level for viewing. When the pump is off, most of the water from the display tank drains into storage tank, but enough water remains in the display tank to maintain a livable environment for fish or other creatures in the display tank. The draining of water from the display tank to the storage tank lowers the center of gravity of the mobile aquarium making the mobile aquarium more stable for moving and also lowers the water level in the display tank to stop water from sloshing out of the display tank when the mobile aquarium moves.

In accordance with another aspect of the invention, a background lighting system for an aquarium includes a semi-transparent or semi-opaque sheet that has a first pattern on a first side and a second pattern on the second side. The first pattern may be, for example, a solid or graduated blue shading while the second pattern is an aquatic or under water scene. A light source projects light through the sheet from the second side to the first side making the image on the back side of the sheet visible through the image on the first side. The combination of images creates the illusion of depth to a scene at the back of the aquarium.

FIGS. 1A and 1B respectively show a side view and a front view of an aquarium 100 in accordance with an embodiment of the invention. Aquarium 100 includes a display tank 110 and a storage tank 120 that are mounted on a wheeled cart 130. Cart 130 has a handle 136 and wheels 138 that allow a user to roll aquarium 100 to a desired location. Wheels 138 can be, for example, four casters where one pair of casters are fixed mounted and another pair of casters are swivel mounted. Preferably, wheels 138 have locks or brakes that keep aquarium 100 from rolling when in place for viewing. Display tank 10 is bolted to cart 130, but alternatively, a mounting structure can surround and attach tank 110 to cart 130. A front face of display tank 110 is transparent for viewing of fish or other creatures living in display tank 110. The back of display tank 110 is also a transparent for a background lighting system 160 described below, but the sides and bottom of display tank 110 can be transparent or opaque. Storage tank 120 holds water drained from display tank 110 but typically is not a habitat for fish. Accordingly, storage tank 120 need not be visible and is enclosed in a lowest compartment 134 of cart 130. Storage tank 120 can be made of any desired material, including entirely opaque materials. To prevent water from sloshing or draining out of storage tank 120 when aquarium is moved or tilted, storage tank 120 includes baffles 122 and an overhang 124.

A plumbing system or fluid transfer system including a pump 140, tubing, and stand-off pipes 146 and 148 connects display tank 110 to storage tank 120. Pump 140 has an inlet line for receiving fluid from storage tank 120 and outlet line 144 leading into display tank 140. FIG. I shows only an example of a plumbing system which can be varied in a number of ways. In particular, stand-off pipes 146 and 148 are suitable for a system having openings through the bottom of display tank 110. Alternatively, compression fitting are suitable for systems with inlets or outlets in the walls of display aquarium 110. Additionally, in the embodiment illustrated, pump 140 is a submersible pump and is disposed in storage tank 120. Alternatively, any type of pump can be used and can be mounted outside storage tank 120, for example, in a compartment 132 of cart 130. A filter 142 such as a foam filter, a canister filter, or a wet/dry filter connects to pump 140. The height of an inlet/outlet at the opening of stand-off pipe 146 and the height of an overflow outlet at the opening of stand-off pipe 148 control respective water levels 116 and 118 in display tank 110 for moving aquarium 100 and for viewing aquarium 100. For viewing, pump 140 is turned on and pumps water from storage tank 120 through filter 142, tube 144, and stand-off pipe 148 into display tank 110. Pump 140, thus fills display tank 110 until water reaches the overflow outlet at level 118 and drains out of display tank 110 through stand-off 148 back into storage tank 120. In the exemplary embodiment, pump 140 continuously operates, and water continues draining through stand-off pipe 148 during viewing of aquarium 100. Alternatively, pump 140 is turned off, and a valve (not shown) stops flow through stand-off pipe 146 when water reaches level 118. Filter 142 only filters water while pump 140 operates. Alternatively, a separate filter system could be provided that would work while pump 140 is off.

With water at level 118, the center of gravity of aquarium 100 is relatively high because the weight of the water is in the higher tank 110. For safe moving, the center of gravity of aquarium 100 is lowered. In particular, pump 140 is turned off, and water drains from display tank 110 through stand-off pipe 146 into storage tank 120. This lowers the center of gravity of aquarium 100 and makes aquarium 100 more stable. In the embodiment of FIGS. 1A and 1B, water drains out of display tank 110 through stand-off pipe 146 and passes through pump 140. In an alternative embodiment, the outlet from pump 140 connects to a filler pipe that is separate from stand-off 146, The filler pipe can feed through the top of tank 110. With a separate filler pipe, pump 140 does not resist the flow of water out of tank 110, but a separate solenoid valve (not shown) may be required to stop water flow out of stand-off pipe 146 during viewing.

In an exemplary embodiment, an electrical system of aquarium 100 includes pump 140 and background lighting system 160 and is active whenever aquarium 100 is connected to power. Plugging in aquarium 100 turns on pump 140 and fills display tank 110 for viewing. Aquarium 100 automatic drains tank 110 to level 116 when disconnected from power. Accordingly, aquarium 100 has a lower center of gravity and is ready for moving when unplugged. An automatic feeding system 170 for display tank is typically battery operated or has a battery backup so that a timer that controls feeding of fish operates even when the electrical system is unplugged.

As an alternative or in addition to lowering the water level in display tank 110 to lower the center of gravity of aquarium 100, display tank 110 can be mounted or attached to a mechanism that lowers display tank 110 for moving. Lowering tank 110 makes aquarium more stable, i.e. less prone to tipping over. Leakage or spilling from display tank 11I can be control using an overhang on display tank 110.

Figure 3:
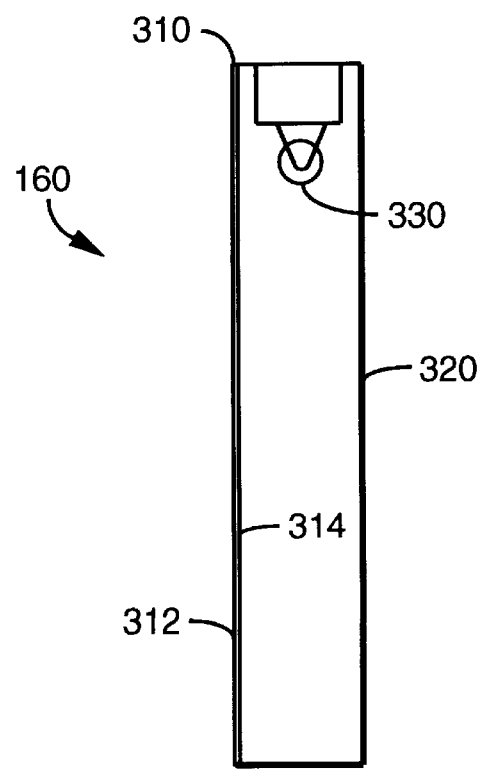
FIG. 3 illustrates a background lighting system in accordance with an embodiment of the invention.

In one exemplary embodiment of the invention, compartment 134 is about 12" high and has a base that is about 26" wide and 30" long. Storage tank 120 which fits in compartment 134 is about 10" high and has a base about 25" wide by 29" long. Overhang 124 of storage tank 120 extends about 8" over the base to prevent spilling when tank 120 is 80% full and tilted by as much as 30% (2:1) grade. Cabinet 132 is about 14" high and has a base that is about 10" wide and 30" long. FIG. 3 shows a perspective view of the exemplary embodiment of display tank 110. In the exemplary embodiment, display tank 110 is made of clear Plexiglas and includes a front face 210 that is 30" by 20", back face 220 which is 30" by 18", a bottom 230 which is 30" by 10", two sides 240 which are 7" by 18", and a top 250 which is 30" by 7" with a 10" by 5" hole in its center. Top 250 provides an overhang that further prevents spilling from display tank 110. As shown, front face 210 extends 2" below bottom 230 and has holes 212 for bolts that attach to the front of compartment 132. Similarly, bottom 230 extends 3" beyond back face 220 and has holes 232 for bolts that attach to the top of compartment 132. Within display tank 10, stand-off pipes 146 and 148 are respectively 4" and 17" tall. Stand-off pipes 146 and 148 can be transparent to improve the appearance of display tank 110. These specific dimensions are not intended to limit the scope but do illustrate one specific embodiment of the invention.

FIG. 3 shows a side view of the exemplary embodiment of background lighting system 160 which in the exemplary embodiment is about 3" wide, 30" long, and 18" high. Background lighting system 160 includes a sheet 310 and a light source 330. Light source 330 may include, for example, one or more incandescent or fluorescent lights that illuminate a back side 314 of sheet 310. A back wall 320 of system 160 reflects light onto sheet 310. Sheet 310 has a first image or pattern on a front side 312 that is adjacent back face 220 of display tank 110. A second image or pattern is on back side 314 of sheet 310. In accordance with an aspect of the invention, sheet 310 is semi-transparent or semi-opaque so that when light source 330 illuminates sheet 310 the second image is visible through the first image. Suitable materials for sheet 310 include but are not limited to paper and plastic.

Reversible aquarium backings such as commercially available from Pennn-plax, Inc. are intended for display of a first image or a second image alone but are suitable for background lighting in accordance with the invention to display an overlapping of images. A sheet where the first image has a graduated shading of a color such as blue that is lighter at its top and darkens toward its bottom and the second image is an aquatic scene, provides a particularly pleasing background where the aquatic scene appears to be behind a distance of water that is illuminated from above. Although the exemplary embodiment only provides background lighting for at back face 220 of display aquarium 110, alternative embodiments of the invention provide similar background lighting at sides 240 of display tank 110.

Figure 4:
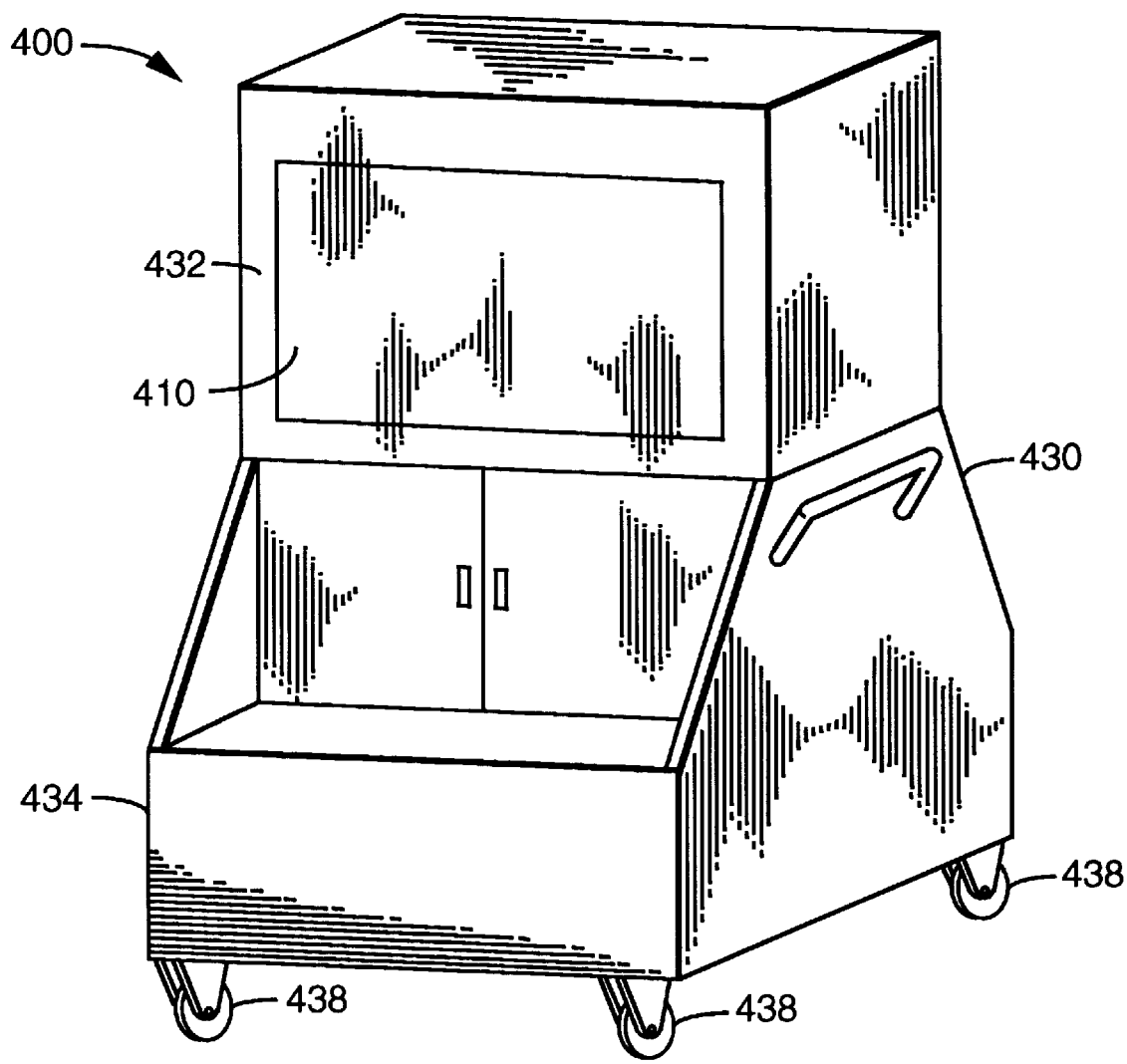
FIG. 4 shows a perspective drawing of an aquarium in accordance with an embodiment of the invention.

FIG. 4 shows an aquarium 400 in accordance with another embodiment of the invention. In aquarium 400, a cabinet 430 having wheels 438 encloses a display aquarium 410. Display tank 410 can be attached to cabinet 430 or simply placed inside a compartment 432 which keeps tank 410 secure. A lower compartment 434 contains a storage tank (not shown). An advantage of enclosing display tank 410 is that cabinet 430 can more easily conceal tubing connecting display tank 410 to the storage tank. Additionally, a surrounding mounting structure such as shown in FIG. 4 avoids bolt holes which may cause cracking of Plexiglas in display tank 110.

Figure 5:
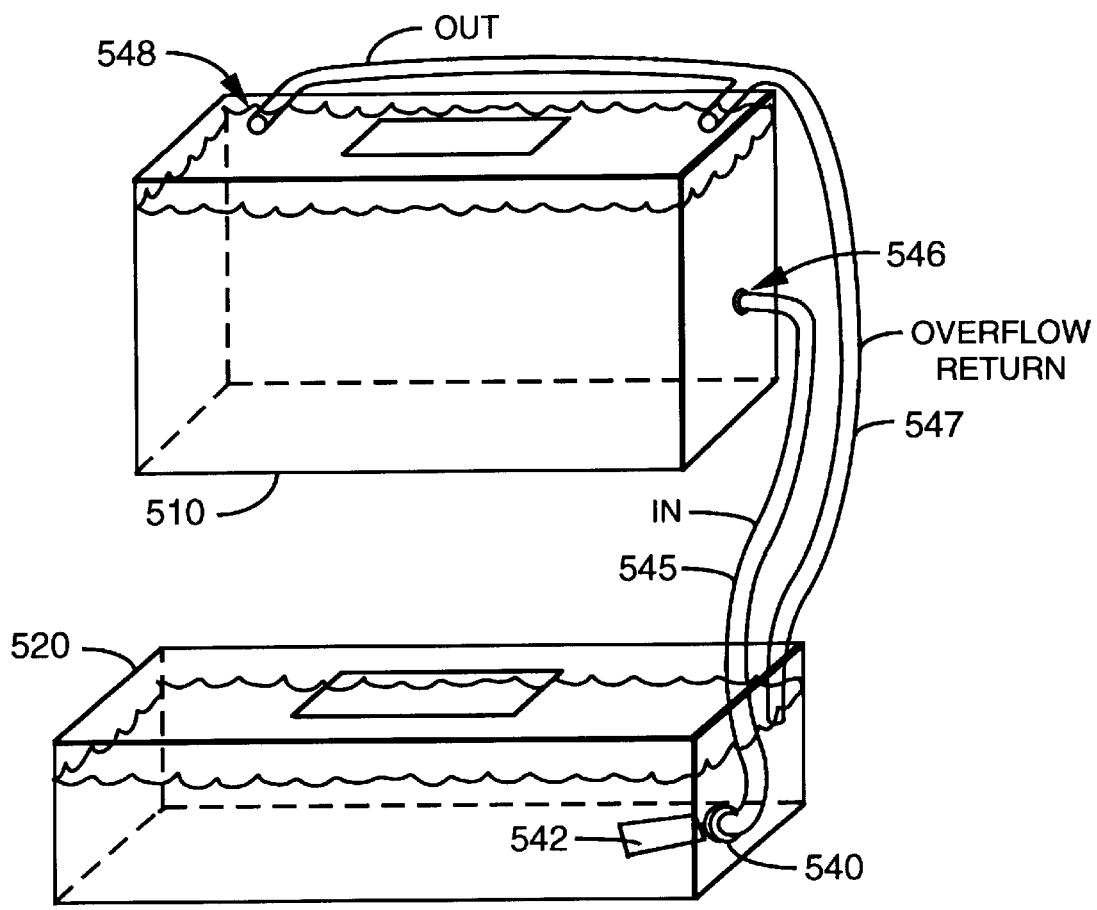
FIG. 5 shows a display tank and a storage tank connected together by a plumbing system in accordance with an embodiment of the invention.

FIG. 5 illustrates a fluid transfer system where a display tank 510 has inlets/outlets 546 and 548 through side and back faces. Tubing 545, which is preferably flexible, connects inlet/outlet 546 to a pump 540 in a storage tank 520. Outlets 548 are overflow outlets that tubing 547 connects to storage tank 520. For viewing, pump 540 draws water from storage tank 520 through a filter 542 and pumps the water into display tank 510. When the water level in display tank 510 reaches the height of outlets 548 on the back of tank 510, water flows back through outlets 548 and tubing 547 to storage tank 520. For moving, pump 540 is turned off and water flows out of display tank 510 through inlet/outlet 456 and tubing 455. The height of inlet/outlet 546 on the wall of display tank 510 controls the water level in tank 520 for moving Although the invention has been described with reference to particular embodiments, the description is only an example of the invention's application and should not be taken as a limitation. Various adaptations and combinations of features of the embodiments disclosed are within the scope of the invention as defined by the following claims.

I claim:

1. A mobile aquarium comprising:

a cart having wheels;

a display tank attached to an upper portion of the cart;

a storage tank in a lower portion of the cart; and a pump connected to pump water from storage tank to the display tank.

2. The mobile aquarium of claim 1, wherein:

when the pump is on, the pump maintains a water level in the display tank for viewing creatures in the display tank, and when the pump is off, water drains from the display tank into the storage tank so that the water level in the display tank is sufficient to maintain a livable environment for the creatures in the display tank and a water level in the storage tank lowers a center of gravity of the aquarium to improve stability when moving the mobile aquarium.

\* \* \* \* \*